(12) United States Patent
Wislinski et al.

(10) Patent No.: US 6,356,698 B1
(45) Date of Patent: Mar. 12, 2002

(54) OPTICAL TRAY COVER

(75) Inventors: Martin T. Wislinski, Edison; Abdallah Al-Hamdan, Sayreville, both of NJ (US); Stephen W. Sedgwick, Glenside, PA (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/459,906

(22) Filed: Dec. 14, 1999

(51) Int. Cl.[7] .................................................. G02B 6/00
(52) U.S. Cl. ...................................... 385/135; 385/134
(58) Field of Search ................................ 385/134, 135, 385/136, 137, 138, 139

(56) References Cited

U.S. PATENT DOCUMENTS

| | | | | |
|---|---|---|---|---|
| 4,850,901 A | * | 7/1989 | Smith et al. ............. 385/135 X |
| 5,129,030 A | * | 7/1992 | Petrunia ...................... 385/135 |
| 5,280,135 A | | 1/1994 | Berlin et al. .................. 174/67 |
| 5,497,297 A | | 3/1996 | Kilmer et al. .............. 361/737 |
| 5,515,200 A | * | 5/1996 | Delrosso et al. ............ 359/341 |
| 5,689,604 A | * | 11/1997 | Janus et al. .................. 385/134 |
| 5,689,606 A | * | 11/1997 | Hassan ........................ 385/135 |
| B15,280,135 | | 1/1998 | Berlin et al. .................... 174/67 |
| 5,802,237 A | * | 9/1998 | Pulido ........................ 385/135 |
| 5,838,858 A | * | 11/1998 | White ........................ 385/76 |
| 5,911,027 A | * | 6/1999 | Macken et al. ............. 385/135 |
| 5,966,492 A | * | 10/1999 | Bechamps et al. .......... 385/135 |
| 5,995,700 A | * | 11/1999 | Burek et al. ................ 385/135 |
| 6,009,224 A | * | 12/1999 | Allen ......................... 385/135 |
| 6,016,378 A | * | 1/2000 | Cuny et al. .................. 385/135 |

* cited by examiner

*Primary Examiner*—Brian Healy

(57) ABSTRACT

A system for protecting optical components is disclosed. The system includes an optical tray with at least one optical component and a cover that can be mounted on the optical tray. The optical tray includes a base with an aperture and a door assembly mounted on the base. The aperture has an area that is sufficiently large for access to components on the optical tray. The door assembly has at least one door having a surface area sufficient to cover at least a portion of the aperture. The cover protects the components and contents of the optical tray against external shock, including mechanical, electrical and electromagnetic impulses, yet allows easy access to these components and contents when desired.

21 Claims, 10 Drawing Sheets

OPTICAL TRAY COVER

FIELD OF THE INVENTION

The present invention relates to the field of manufacturing optical systems and, more particularly, to a system for protecting components and subsidiary components of optical systems during their manufacturing and testing processes.

BACKGROUND OF THE INVENTION

Submarine optical transmission systems carry much of the information that is communicated, for example, between the world's continents. Submarine optical transmission systems may include such fiber-optic communication devices as optical repeaters, which appear at regular intervals to amplify optical signals traversing an optical link. Such periodic amplification ensures that the transmitted signals do not become so attenuated that they cannot be interpreted at a receiving station. Associated electronic and optical components for the optical repeaters are often placed in a tray (an optical pump tray) as part of the assembly process for the submarine optical transmission system. More generally, optical components may be placed on a tray (an optical tray) for manufacturing, testing, repair or installation purposes.

Portions of submarine optical transmission systems, including optical repeaters and associated components, are intended to remain in-place on the bottom of the ocean under thousands of feet, and even miles, of water for many years. Due to the difficulties encountered when having to repair, replace, or generally service these systems and for cost effectiveness, it is desirable that these systems be highly reliable. Disadvantageously, however, the design life of the components of these systems may be substantially reduced due to external shock caused by electrical, mechanical and electromagnetic impulses acting on the components during the manufacturing and testing processes. Specifically, these mechanical and electrical impulses may degrade the components and necessitate replacement or service at great cost during the design lifetime of the optical system in which the components are located. Accordingly, it is highly desirable that the optical repeaters and associated components be adequately protected against mechanical, electrical, and electromagnetic impulses during the manufacturing and testing processes.

One way of protecting the optical repeaters and associated components would be to use a permanent cover on the tray to protect the contents of the tray against electrical and mechanical impulses. However, access to certain components is required during the manufacturing and testing processes, so that a simple permanent cover is not practicable. On the other hand, a simple removable cover presents problems in that the act of removing or placing the cover on the components often subjects the components to the same mechanical and electrical impulses against which the cover is meant to protect.

Therefore, it would be desirable to provide a cover for an optical pump tray, and more generally, for optical components situated on an optical tray, which would protect the components of the tray against external shock caused by mechanical, electrical and electromagnetic impulses, would be movable, and would not subject the components to mechanical and electrical impulses during manipulation of the covers for access to the components.

SUMMARY OF THE INVENTION

A system for protecting optical components in accordance with an embodiment of the present invention includes an optical tray containing at least one optical component and a cover removably mountable on the optical tray. The cover has a base with an aperture and a door assembly mounted on the base. The door assembly has at least one door movably positionable over the aperture.

BRIEF DESCRIPTION OF THE DRAWINGS

The various features of the invention will best be appreciated by simultaneous reference to the description that follows and the accompanying drawings, in which.

DETAILED DESCRIPTION

Figure 1:
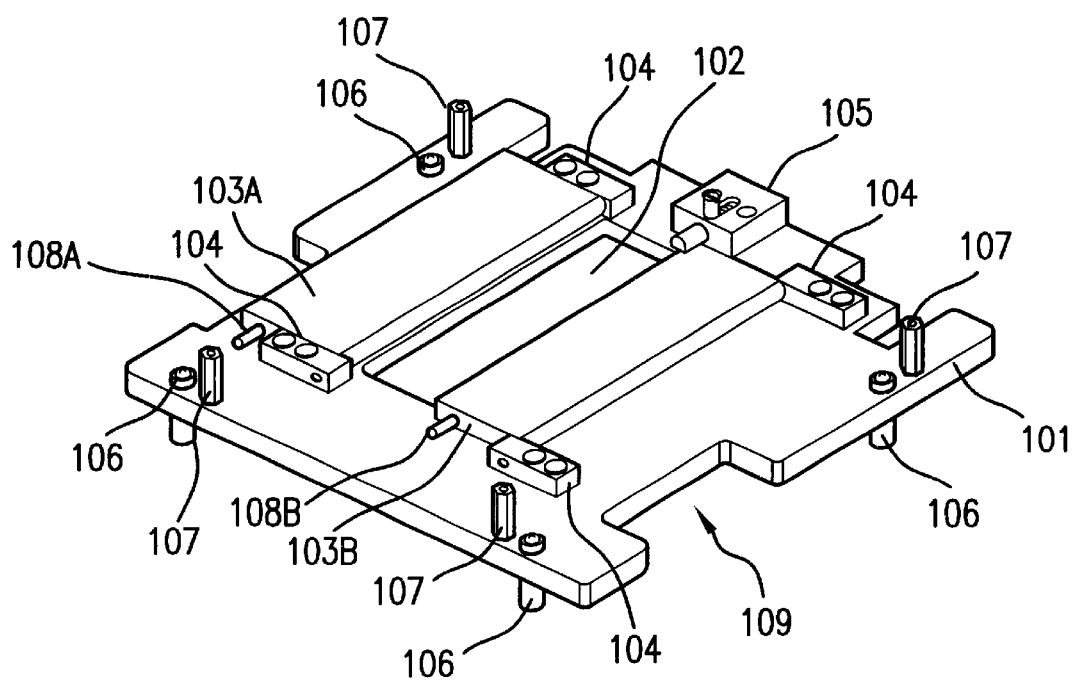
FIG. 1 is a perspective view of an embodiment of a cover for an optical tray in accordance with the principles of the present invention.

FIG. 1 illustrates an embodiment of a cover for an optical tray in accordance with the principles of the present invention. The cover comprises a base 101 and a door assembly mounted on the base 101. The base 101 may be made at least partially of a material sufficiently rigid to protect against accidental puncture to shield optical components on an optical tray situated below the cover from undesired physical contact. Accidental puncture of an insufficiently rigid base otherwise may be caused, for example, by dropping or bumping an optical tray and mounted cover combination, or by dropping an object on or bumping an object against such combination. Consequently, the base is made of a hard plastic, metal or other rigid material that would normally be sufficiently rigid to protect against such accidental puncture.

As used herein, the term "optical component" includes a passive optical component such as, for example, an optical fiber, a lens, or a fiber amplifier, as well as an electro-optical component such as, for example, a laser. The term "optical component" also includes such components together with any electronics associated with the components.

At least part of the base and/or door assembly may be made electrostatic discharge-safe by treating or coating the base and/or door assembly with anti-static or electrostatic discharge-safe material. For example, a base and/or door assembly made of a material like Plexiglas® or Lexan® (polycarbonate) may be made electrostatic discharge-safe by treating surfaces with an anti-static or electrostatic discharge-safe coating. Additionally, part of at least one of the base or door assembly may be made from a transparent material, to allow illumination and visibility of components on an optical tray to which the cover can be attached. The machining process may cause edges of the base and/or door assembly to become optically unclear. These edges may be made optically clear by buffing or through shining.

The base 101 defines an aperture 102 within it. The aperture 102 is sufficiently large to provide access to optical components situated on an optical tray to which the cover can be mounted. Such access may be used, for example, to mount, repair, replace, adjust and otherwise manipulate optical components located on an optical tray. One example of a sufficiently large aperture would be where the aperture has a size substantially equal to the area on the optical tray occupied by optical components that are to be manipulated. As an other example, an aperture size that is 70% to 130% the size of the area on the optical tray occupied by the optical components to be manipulated may be sufficiently large for access. The door assembly comprises a first door 103A, which includes a first finger grip 108A; a second door 103B, which includes a second finger grip 108B, hinge support mechanisms 104; and one movable latch mechanism 105 adapted to removably secure the doors in a shut position. Finger grips 108A and 108B allow easy opening and shutting of doors 103A and 103B, respectively.

As shown in FIG. 1, each of the doors 103A and 10033 is attached to the base 101 via two hinge support mechanisms 104. Each of the hinge support mechanisms 104 is attached to one of the doors 103A and 103B with hinge pins which will be further described below in connection with FIG. 4D. The hinge pins 410 attached to either of the doors 103A or 103B define an axis around which that door rotates into an open and shut position. Doors 103A and 103B completely cover the aperture 102 when the doors 103A and 103B are both in their shut positions. Part of each hinge pin penetrates a groove in hinge support mechanism 104, and another part of the hinge pin penetrates a groove in one of the doors 103A and 103B. Each hinge support mechanism 104 is attached to the base 101 by two screws that are perpendicular to the surface of the base 101. Proper placement of the hinge pin grooves in doors 103A and 103B allows either of the doors 103A and 103B to lay flat on the top surface of base 101 when that door is in its open position. Such proper placement of the hinge pin grooves in one of the doors 103A or 103B can be obtained by having the shortest distance, along the surface of that door normal to a hinge pin or hinge pin groove, from the center of the hinge pin or hinge pin groove to the bottom surface of that door be greater than the distance, along the surface of that door normal to that hinge pin or hinge pin groove, from the center of that hinge pin or hinge pin groove to the hinge surface of that door (the hinge surface for a door is the surface of that door that is parallel to the axis of rotation defined by the hinge pins, excluding the top and bottom surfaces of that door, and which is closest to that axis.) The movable latch mechanism 105 is attached to the base 101 through the use of two screws. The movable latch mechanism 105, which will be described in more detail below in connection with FIGS. 5A–5I, is used to slide a latch tongue 502 in and out (see FIGS. 5A–5I), in order to removably secure at least one of the doors 103A or 103B in a shut position. The latch tongue 502 removably secures the doors 103 in their shut positions when the doors 103 are in their shut positions and the latch tongue 502 is slid into its locked position.

This embodiment of the cover shows four housings 106, which have been inserted into four holes on the base 101 and which extend perpendicular to the base 101. Each housing is threaded such that a screw through the housing may attach the base 101 to an optical tray.

This embodiment of the cover also includes four stand-offs 107 which are attached to the base 101 and which extend perpendicular to the base 101. Each stand-off 107 is threaded and a screw can be used to attach each threaded stand-off 107 to a corresponding hole in the base 101. At least one of these corresponding holes may be a blind hole which does not penetrate the bottom surface of the base 101. Such a blind hole allows mounting or removal of a stand-off without potentially pushing debris through the hole and through the bottom plane of base 101. The stand-off 107 allow the cover to be placed on a flat surface in an upside-down configuration. Depending on the configuration of the optical tray to which the cover attaches a number of grooves 109 may be present on the base 101, to allow for additional access to components on the optical tray.

The cover shown in FIG. 1 can be modified in many ways to protect components in an optical tray attached to the cover. Although in this embodiment base 101 is shown to have a square planar shape, other shapes are possible, such as a circular shape or non-planar shapes, where the shape of the base complements the shape of an attached optical tray. Moreover, the aperture may also have different shapes depending on the configuration of the components to be accessed on an optical tray attached to the cover. Similarly, the number and shapes of the doors which are to be used to cover the aperture may vary with the shape of the aperture. The only design consideration is that the total surface area of all the doors exceed the area of at least a portion of the aperture under which the components that are to be protected are located.

Figure 2:
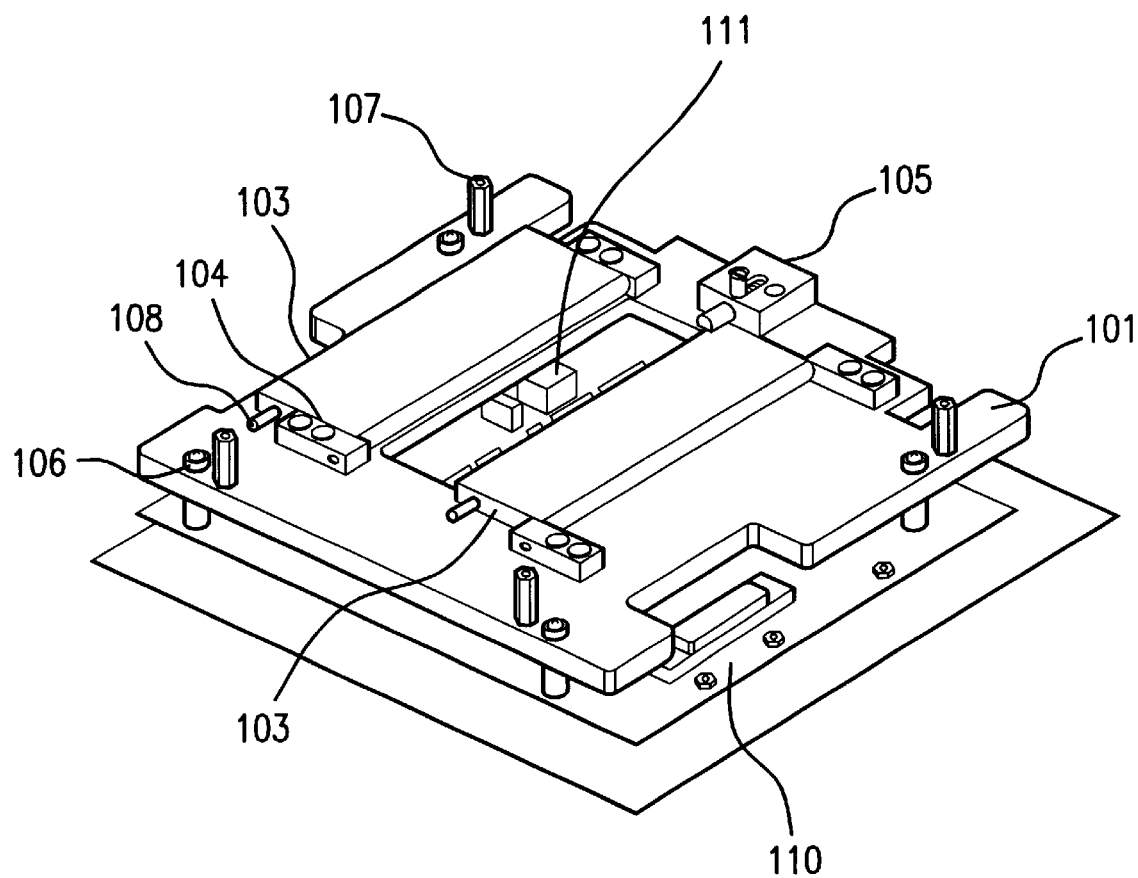
FIG. 2 is a perspective view of the embodiment shown in FIG. 1 as attached to a representative optical tray.
Figure 3A:
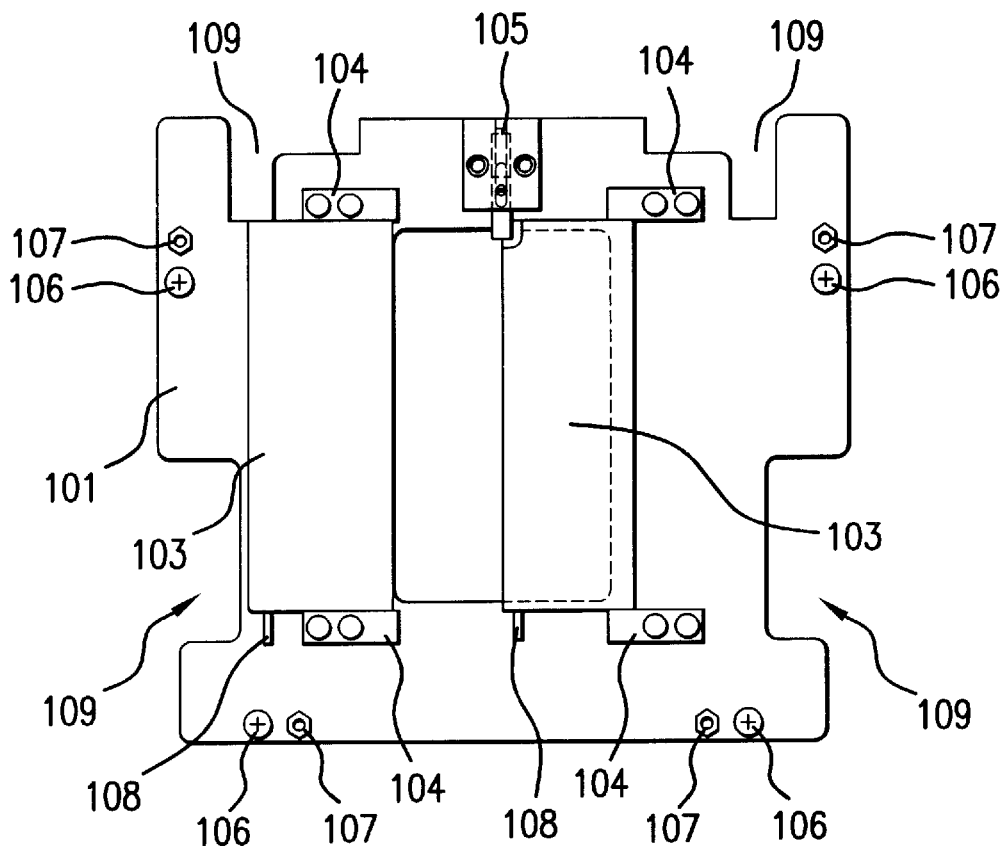
FIG. 3A is a top view of the embodiment shown in FIG. 1.
Figure 3B:
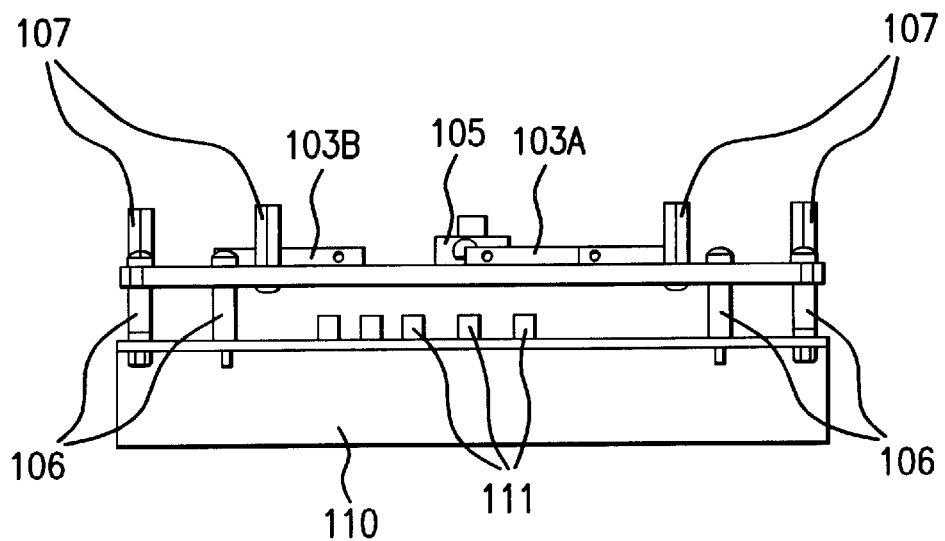
FIG. 3B is a side view of the embodiment shown in FIG. 1 as attached to a representative optical tray.

FIGS. 2, 3A and 3B illustrate the cover of FIG. 1 attached to an optical tray 110 with optical components 111. All other components shown in these figures are identical to those shown in FIG. 1 and will not be further described.

Figure 4A:
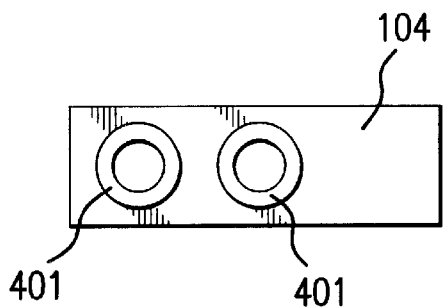
FIG. 4A is a top view of the hinge support mechanism for the embodiment shown in FIG. 1.
Figure 4C:
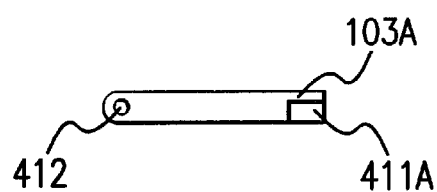
FIG. 4C is a top view of one of the doors for the embodiment shown in FIG. 1.
Figure 4B:
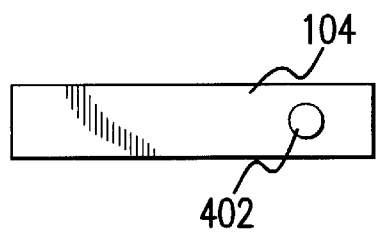
FIG. 4B is a side view of the hinge support mechanism of FIG. 4A.

FIG. 4A further illustrates hinge support mechanism 104. The hinge support mechanism 104 is a rectangular block with two counter-sunk screw holes 401 used for attaching the hinge support mechanism 104 to the base 101. The corresponding holes in the base 101 for attaching the hinge support mechanism with screws may be blind holes. As can be seen in FIG. 4B, the hinge support mechanism 104 also includes a hinge groove 402 through which a hinge pin connecting the hinge Support mechanism to one of the doors 103A or 103B is inserted. In an alternative embodiment, at least one hinge pin placed in an elongated groove in the door and penetrating through opposing surfaces of a door can be used.

Figure 4D:
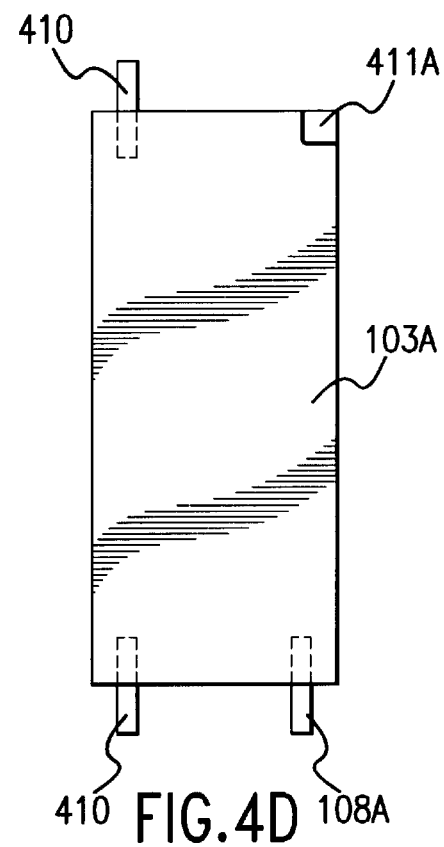
FIG. 4D is a first side view of the door of FIG. 4C.

FIG. 4D is a top view of door 103A, which is formed in a rectangular configuration. The door 103A has two grooves 412 on opposite sides into which hinge pins 410 are inserted. The hinge pins 410 can be co-linear and define an axis about which the door 103A can rotate in and out of its open and shut positions. The door 103A also has a groove 413 on one side through which finger grip 108A is fit. The finger grip 108A can be used to easily rotate the door 103A between its open and shut positions. The door 103A also includes a notch 411A which has been cut into the top surface of the door 103A. The notch 411A has been cut sufficiently deep into the door 103A such that the latch tongue 502 of the movable latch mechanism 105 can removably secure the door 103A in its shut position. FIG. 4C is a side view of door 103A. As shown in FIG. 4C, this side includes a hinge groove 412 and notch 411A. FIG. 4E shows a side view of the opposite side of door 103A. As shown in FIG. 4E, this side includes a hinge groove 412 and a finger grip groove 413.

Figure 4F:
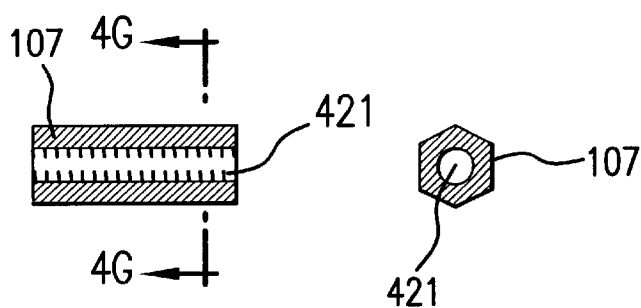
FIG. 4F is a cross-sectional view of one of the stand-offs of the embodiment shown in FIG. 1.
Figure 4G:
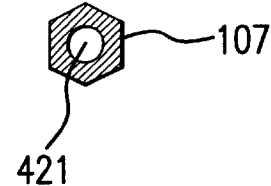
FIG. 4G is a cross-sectional view of the stand-off of FIG. 4I; as taken along line 4G—4G in FIG. 4F.
Figure 4E:
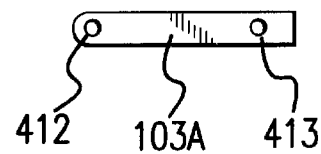
FIG. 4E is an opposing side view of the door of FIG. 4C.

FIG. 4F is a cross-sectional view of stand-off 107. The stand-off 107 is a long tubular structure with a hexagonal cross-section and a cylindrical cut-out 421 parallel to the longitudinal axis of the stand-off 107. The inner wall of the stand-off 107 is threaded for housing a screw used for attaching the stand-off 107 to a hole in base 101. FIG. 4G shows a cross-section of stand-off 107 through line 4G—4G. This view clearly illustrates the hexagonal cross-section of the stand-off 107 and the cylindrical cut-out parallel to the axis of the stand-off 107.

Figure 5A:
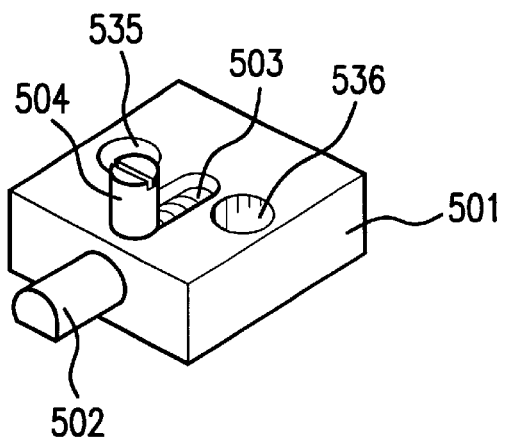
FIG. 5A is a perspective view of the movable latch mechanism of the embodiment shown in FIG. 1.
Figure 5B:
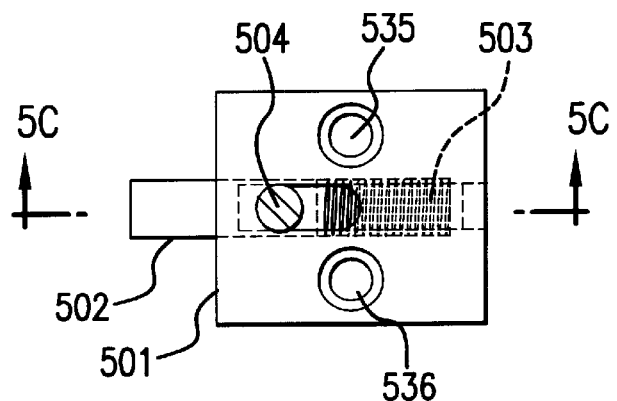
FIG. 5B is a top view of the movable latch mechanism of FIG. 5A.
Figure 5C:
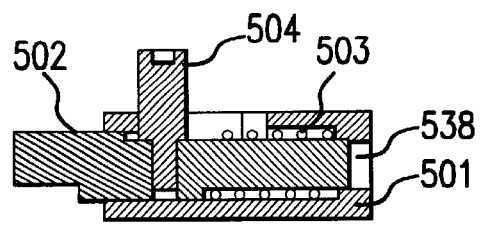
FIG. 5C is a cross-sectional view of the movable latch mechanism as taken along line 5C—5C of FIG. 5B.
Figure 5D:
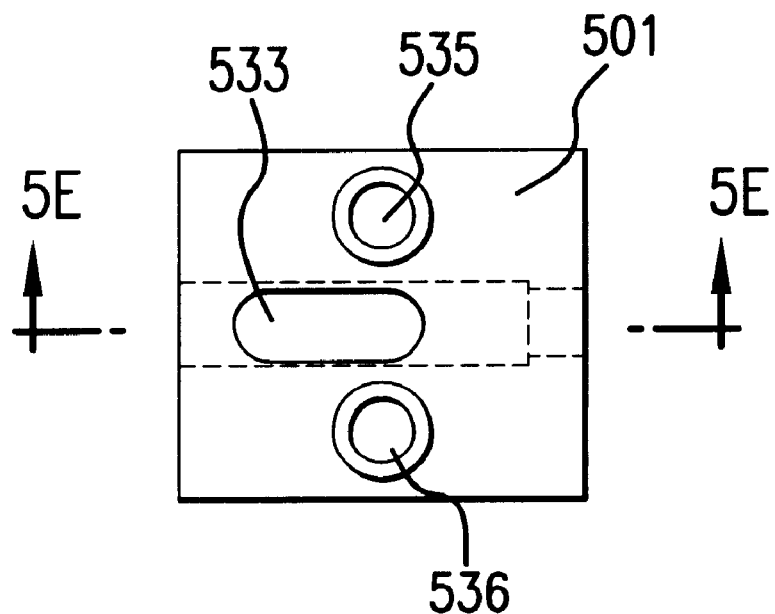
FIG. 5D is a top view of the latch housing of FIG. 5A.
Figure 5E:
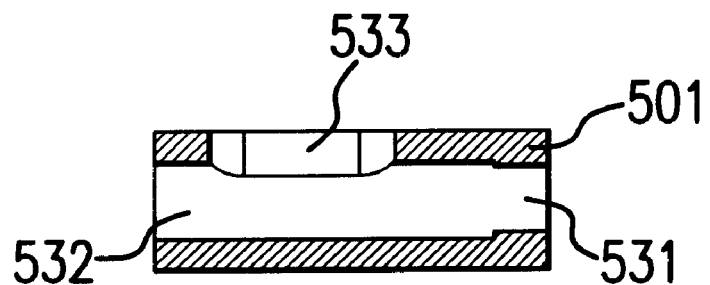
FIG. 5E is a cross-sectional view of the latch housing as taken along line 5E—5E of FIG. 5D.

FIGS. 5A through 5I show various views of the movable latch mechanism 105. Movable latch mechanism 105 includes four pieces: latch housing 501 latch tongue 502, latch spring 503, and latch grip 504. Latch housing 501 is formed as a rectangular block with grooves for accommodating the other three pieces of the movable latch mechanism. The latch housing 501 also includes two countersunk screw holes 535 and 536 for attaching the movable latch mechanism 105 to the base 101. The corresponding holes in base 101 for attaching the movable latch mechanism may be blind holes. The latch housing 501 has a cylindrical cut-out centered on its central axis. As shown in FIG. 5E, this cylindrical cut-out has a smaller diameter at the back end 531 of latch housing 501 compared to the front end 532. This structure functions as a stopper for the latch tongue 502 as shown in FIG. 5C. The latch housing 501 also includes a groove 533 on its top surface as shown in FIG. 5E. This groove 533 is deep enough to open into the cylindrical cut-out in latch housing 501. The central axis of this groove 533 is parallel to the longitudinal axis of the cylindrical cut-out in latch housing 501. The width of this groove 533 is large enough to allow the latch grip 504 to fit through the groove 533 and project out of the top surface of the latch housing 501 as shown in FIG. 5C. FIG. 5D is a top view of latch housing 501. In this figure, the groove 533, as well as the countersunk screw holes 535 and 536 used for attaching the base 101 to the movable latch mechanism 105, can be seen clearly. FIG. 5B shows the same view of latch housing 501 together with the latch tongue 502, the latch spring 503, and the latch grip 504.

Figure 5F:
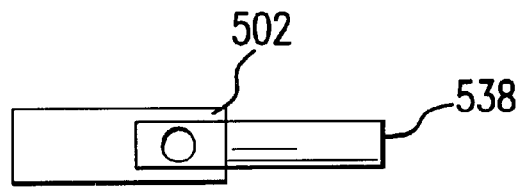
FIG. 5F is a top view of the latch tongue of FIG. 5A.
Figure 5G:
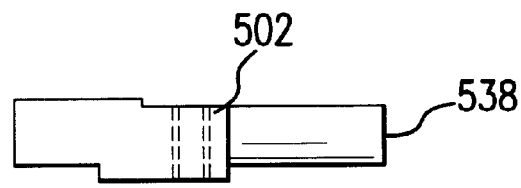
FIG. 5G is a side view of the latch tongue of FIG. 5F.
Figure 5H:
FIG. 5H is a top view of the latch grip of FIG. 5A.
Figure 5I:
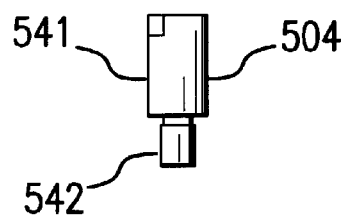
FIG. 5I is a side view of the latch grip of FIG. 5H.

As shown in FIG. 5C, latch tongue 502 is a single elongated piece which is dimensioned to allow it to slide back and forth within the cylindrical cut-out of latch housing 501. Latch tongue 502 contains a screw hole perpendicular to its longitudinal axis which allows the latch grip 504 to attach to latch tongue 502. The part of latch tongue 502 shown projecting out of latch housing 501 in FIG. 5C is the part of latch tongue 502 which removably locks and secures doors 103 in their shut position. Latch spring 503 placed around the back end 538 of latch tongue 502 biases latch housing 502 out of latch housing 501. FIG. 5F is a top view of latch tongue 502 and FIG. 5G is a side view of latch tongue 502. FIGS. 5H and 5I illustrate latch grip 504. Latch grip 504 is made up of a top section 541 and a bottom section 542. The bottom section 542 is threaded and allows latch grip 504 to screw into the threaded hole in latch tongue 502. This can be seen in FIG. 5C. The top section 541 of latch grip 504 is thicker than the bottom section 542 and projects through latch housing 501 as shown in FIG. 5C. This allows latch grip 504 to be used for sliding latch tongue 502 back and forth within the cylindrical cut-out in latch housing 501.

Figure 6C:
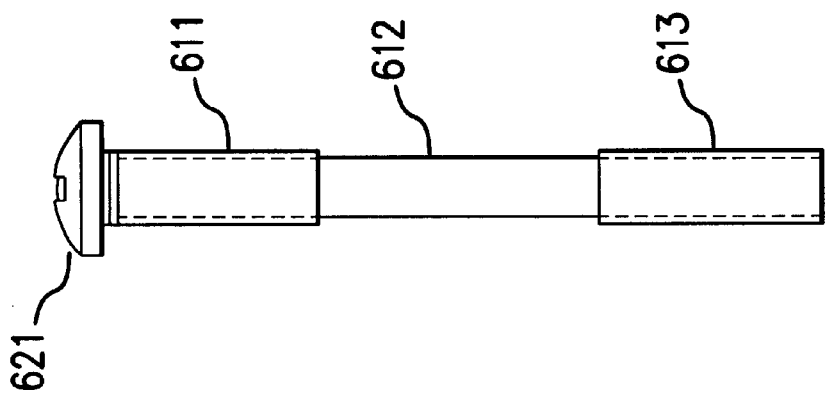
FIG. 6C is a side view of a screw for the housing shown in FIG. 6A.
Figure 6B:
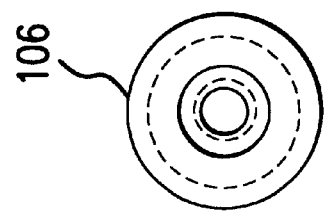
FIG. 6B is a top view of the housing shown in FIG. 6A.
Figure 6A:
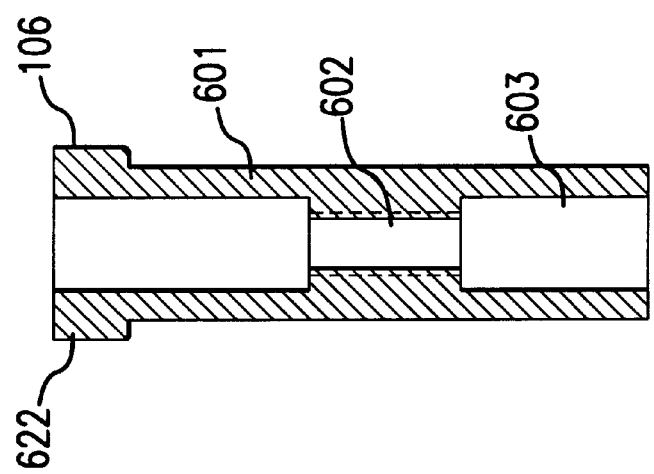
FIG. 6A is a cross-sectional view of one of the housings shown in FIG. 1.

FIG. 6A shows one of the housings 106 of FIG. 1 in more detail. The housing 106 is cylindrical in shape and contains three cylindrical, hollow sections 601, 602 and 603. Moreover, at its top end 622, the housing 106 has a larger outer diameter, as shown in FIG. 6A. This functions as a stopper when housing 106 is inserted into a hole on base 101, as shown in FIG. 1. The hollow sections 601 and 603 are not threaded, whereas section 602 is threaded and has a smaller diameter than either of sections 601 and 602. FIG. 6B is a top view of housing 106.

FIG. 6C shows a screw 621 used with housing 106 for mounting an optical tray to base 101, as shown in FIG. 2. This screw 621 is comprised of two threaded sections 611 and 613, and a middle section 612 that is not threaded. The sections of screw 621 and housing 106 are dimensioned such that during the insertion of screw 621 into housing 106 the section of housing 106 corresponding to the unthreaded middle section 612 of screw 621 overlaps and completely contains threaded section 602 of housing 106. In such a configuration, neither of threaded sections 611 or 612 of screw 621 overlaps threaded section 602 of screw 621. Thus, although screw 621 is loose within housing 106 in such a configuration, screw 621 cannot be simply pulled out of housing 106 because threaded section 602 acts as a stopper for threaded section 613 of screw 621. Thus, the structure of screw 621 and housing 106 prevent the screw 621 from falling off housing 106 when an optical tray attached to base 101 is removed; this feature prevents damage to the components that can be caused by the screw 621 falling in to the optical tray.

Figure 7A:
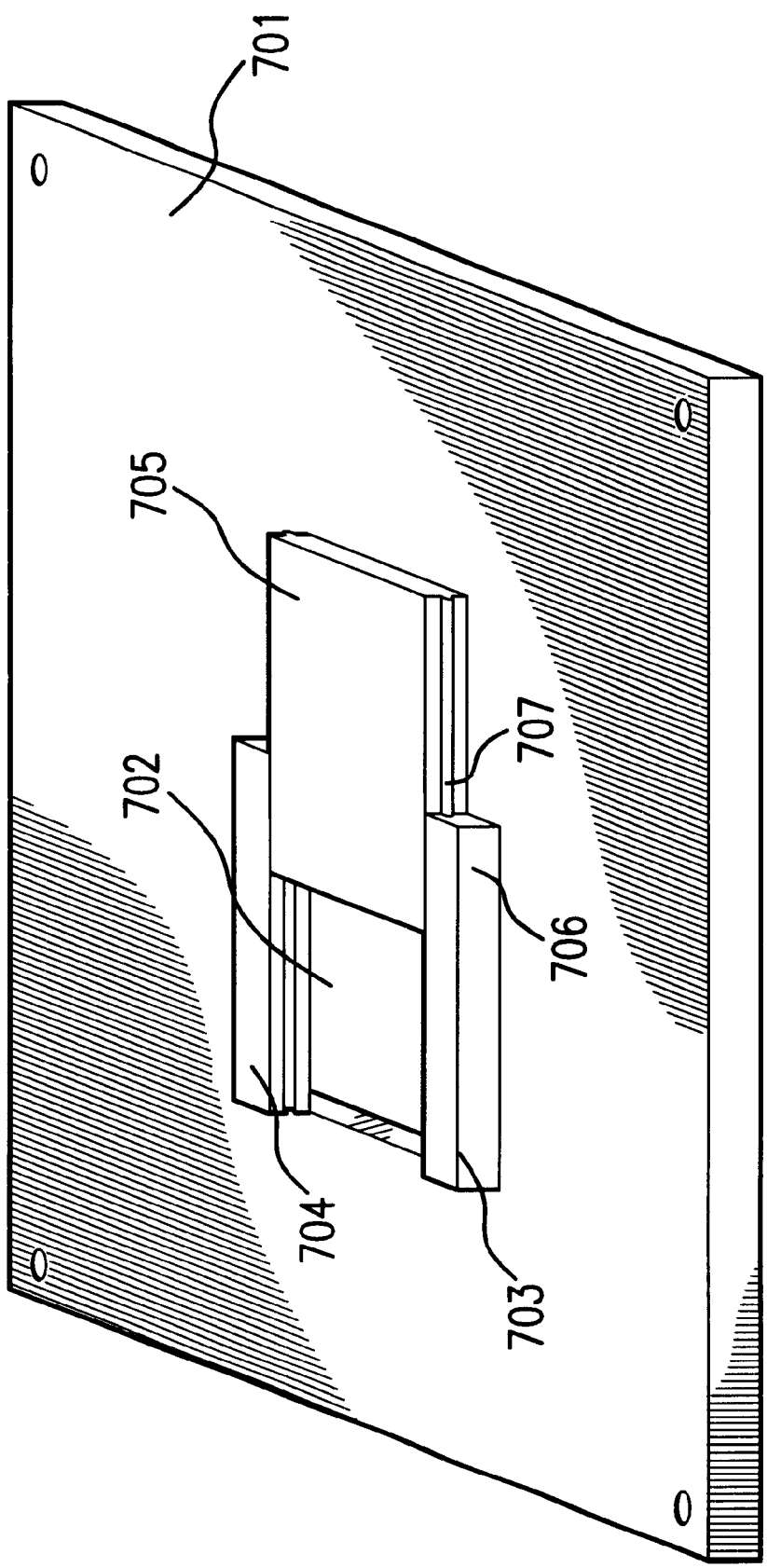
FIG. 7A is a perspective view of a second embodiment of a cover for an optical tray.

Many alternatives to the embodiment disclosed above that are within the scope of the invention are possible. A door may be attached to the base through means other than a hinge support mechanism. For example, a sliding door may be used with the cover. Such an embodiment is shown in FIG. 7A. This embodiment will be discussed in more detail below. One or more housings with screws may be used to attach the base to the optical tray. Moreover, means other than a housing and a screw may be used to attach the optical tray to the base. For example, the optical tray and base may be permanently bonded together. Additionally, means other than a finger grip may be used for opening and shutting a door. For example, handles on the outer surface of a door may be used for that purpose. Finally, any number of stand-offs may be used with the cover.

Figure 7B:
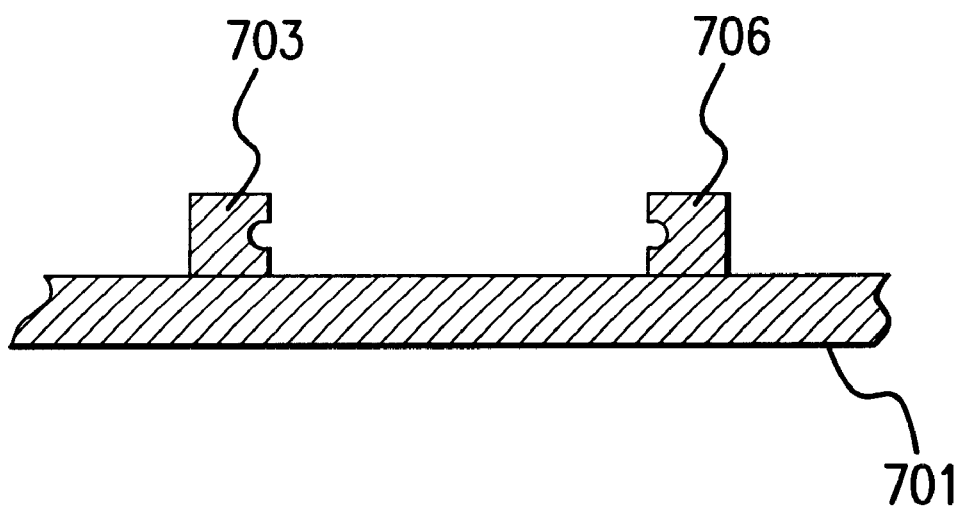
FIG. 7B is a side view of the sliding door brackets for the embodiment shown in FIG. 7A.
Figure 7C:
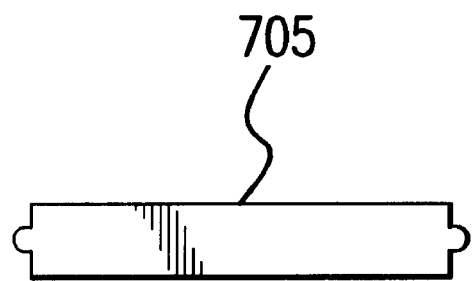
FIG. 7C is a side view of the sliding door for the embodiment shown in FIG. 7A.

FIG. 7A shows an alternative embodiment for a cover in accordance with the present invention with a sliding door. Here, base 701 contains an aperture 702. Sliding door brackets 703 and 704 are mounted to base 701 and contain (grooves parallel to their longitudinal axes along which sliding door 705 may slide. Sliding door 705 has protrusions parallel to its longitudinal axis which match and fit inside the grooves of the sliding door brackets 703 and 704, and allow sliding door 705 to slide in and out of open and shut positions. Sliding door bracket 704 and sliding door 705 contain screw holes 706 and 707, respectively, which may be used to removably secure sliding door 705 in a shut position. FIG. 7B is a side view of base 701 and sliding door brackets 703 and 704. FIG. 7C is a front view of sliding door 705.

As described above in the exemplary embodiments, a system for protecting optical components is provided which includes an optical tray containing one or more optical components and a cover removably mountable on said optical tray. The cover includes a base with an aperture and a door assembly mounted on the base. The aperture has a size which is sufficiently large for access to the optical components over which the cover is mounted. The door assembly has at least one door having a surface area sufficient to cover at least a portion of the aperture. Parts of the base or door assembly may be made of an electrostatic discharge-safe material or a material sufficiently rigid to protect against accidental puncture. The system disclosed herein protects optical components on an attached optical tray against external shock, including mechanical, electrical and electromagnetic impulses. Hence, use of the disclosed system will increase the reliability of optical components that are included within the optical system.

The disclosed embodiments are illustrative of the various ways in which the present invention may be practiced. Other embodiments can be implemented by those skilled in the art without departing from the spirit and scope of the present invention.

What is claimed is:

1. A system for protecting optical components, the system comprising:
   an optical tray containing at least one optical component; and
   a cover removably mountable on said optical tray, said cover including:
      a base defining an aperture; and
      a door assembly mounted on the base, the door assembly including at least one door movably positionable over the aperture.

2. The system of claim 1 wherein a part of at least one of the base and the door assembly is comprised of an electrostatic discharge-safe material.

3. The system of claim 1, wherein the base includes at least one hinge support mechanism engageable with the at least one door, the at least one hinge support mechanism including at least one hinge pin.

4. The system of claim 1 wherein the base has at least one latch mechanism releasably engageable with the door.

5. The system of claim 1 wherein the at least one door has at least one hinge pin projecting normal to at least one surface of the at least one door and wherein the base includes a hinge support mechanism, the hinge support mechanism including at least one hinge pin groove adapted to receive the at least one hinge pin, the at least one door pivotably mounted to the base.

6. The system of claim 5 wherein a shortest distance, on a surface of the at least one door normal to the at least one hinge pin, from the at least one hinge pin to a bottom surface of the door is larger than the shortest distance, on the surface of the at least one door normal to the hinge pin, from the hinge pin to a hinge surface of the door.

7. The system of claim 1 wherein the at least one door is slidably mounted on the base.

8. The system of claim 1 wherein the base includes at least one blind hole.

9. The system of claim 1 wherein the base includes at least one stand-off extending perpendicular to a top side of the base.

10. The system of claim 1 wherein at least a part of the base or door assembly is transparent.

11. A system for protecting at least one optical component in an optical tray from external shock, the system comprising:
    at least one optical component; and
    a cover removably mountable on an optical tray containing the at least one component, said cover including:
       a base defining an aperture, the aperture sufficiently large to provide access to the at least one optical component through the aperture; and
       a door assembly mounted on the base, the door assembly including at least one door movably positionable over the aperture.

12. The system of claim 11, wherein a part of at least one of the base and the door assembly is comprised of an electrostatic discharge-safe material.

13. The system of claim 11, wherein the base includes at least one hinge support mechanism engageable with the at least one door, the at least one hinge support mechanism including at least one hinge pin.

14. The system of claim 11 wherein the base has at least one latch mechanism releasably engageable with the door.

15. The system of claim 11 wherein the at least one door has at least one hinge pin projecting normal to at least one surface of the at least one door and wherein the base includes a hinge support mechanism, the hinge support mechanism including at least one hinge pin groove adapted to receive the at least one hinge pin, the at least one door pivotably mounted to the base.

16. The system of claim 15 wherein a shortest distance, on a surface of the at least one door normal to the at least one hinge pin, from the at least one hinge pin to a bottom surface of the door is larger than the shortest distance, on the surface of the at least one door normal to the hinge pin, from the hinge pin to a hinge surface of the door.

17. The system of claim 11 wherein the at least one door is slidably mounted oil the base.

18. The system of claim 11 wherein the base includes at least one blind hole.

19. The system of claim 11 wherein the base includes at least one stand-off extending perpendicular to a top side of the base.

20. The system of claim 11 wherein at least a part of the base or door assembly is transparent.

21. A system for protecting optical components from external shock and providing access to the optical components, the system comprising:
    an optical tray containing at least one optical component, the at least one optical component covering, a first section on said optical tray, the first section having a surface area;
    a cover removably mountable on said optical tray, said cover including:
       a base defining an aperture, the base sufficiently rigid to protect against accidental puncture, the aperture having a size substantially equal to the surface area of the first section providing access to the at least one optical component through the aperture; and
       a door assembly mounted on said base, the door assembly including at least one door movably positionable over the aperture.

* * * * *